(12) United States Patent
Takatsuka et al.

(10) Patent No.: US 10,501,051 B2
(45) Date of Patent: Dec. 10, 2019

(54) CONTROL DEVICE, CONTROL METHOD, PROGRAM, AND CONTROL SYSTEM

(71) Applicant: OMRON Corporation, Kyoto-shi, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON Corporation, Kyoto-shi (JP)

( * ) Notice: Subject to any disclaimer, the term of this patent is extended or adjusted under 35 U.S.C. 154(b) by 2 days.

(21) Appl. No.: 15/756,152

(22) PCT Filed: Aug. 24, 2017

(86) PCT No.: PCT/JP2017/030242
§ 371 (c)(1),
(2) Date: Feb. 28, 2018

(87) PCT Pub. No.: WO2018/051752
PCT Pub. Date: Mar. 22, 2018

(65) Prior Publication Data
US 2018/0370485 A1    Dec. 27, 2018

(30) Foreign Application Priority Data

Sep. 15, 2016   (JP) .................................. 2016-180468

(51) Int. Cl.
*B60R 25/04*   (2013.01)
*B60R 25/32*   (2013.01)
(Continued)

(52) U.S. Cl.
CPC ............ *B60R 25/04* (2013.01); *B60R 25/104* (2013.01); *B60R 25/31* (2013.01); *B60R 25/32* (2013.01);
(Continued)

(58) Field of Classification Search
CPC .. G07C 9/00182; G07C 9/00674; B60Q 1/50; B60Q 9/008; B60Q 9/00; F41A 19/58;
(Continued)

(56) References Cited

U.S. PATENT DOCUMENTS

| 2008/0121097 | A1* | 5/2008 | Rudakevych ........... F41A 19/58 |
|---|---|---|---|
| | | | 89/28.05 |
| 2009/0045927 | A1* | 2/2009 | Atella .................... G08G 1/207 |
| | | | 340/425.5 |

(Continued)

FOREIGN PATENT DOCUMENTS

| CN | 200953565 Y | 9/2007 |
|---|---|---|
| CN | 104742861 A | 7/2015 |

(Continued)

OTHER PUBLICATIONS

An English translation of the International Search Report of PCT/JP2017/030242 dated Oct. 3, 2017.

(Continued)

*Primary Examiner* — Behrang Badii
(74) *Attorney, Agent, or Firm* — Metrolex IP Law Group, PLLC

(57) ABSTRACT

A control device includes an acquisition unit acquiring a condition of a vehicle upon reception of a control request, an execution ability determination unit determining whether or not the vehicle is in a condition where the control request can be executed safely, an execution control unit executing the control request when the vehicle is determined to be in a condition where the control request can be executed safely, and a changeover control unit implementing control to change over the condition of the vehicle to a condition where the control request can be executed safely. When the vehicle is in a condition where the control request cannot be executed safely, the changeover control unit is activated. After the vehicle becomes in a condition where the control (Continued)

request can be executed safely, the execution control unit executes the control request.

13 Claims, 5 Drawing Sheets

(51) Int. Cl.
  *B60R 25/31*  (2013.01)
  *B60R 25/104*  (2013.01)
  *B62M 6/45*  (2010.01)
  *H04M 11/00*  (2006.01)
  *H04M 11/04*  (2006.01)
  *B62H 5/20*  (2006.01)
  *G08C 17/00*  (2006.01)
  *H04M 1/725*  (2006.01)
  *H04Q 9/00*  (2006.01)
  *B60R 25/10*  (2013.01)
(52) U.S. Cl.
  CPC ............... *B62H 5/20* (2013.01); *B62M 6/45* (2013.01); *G08C 17/00* (2013.01); *H04M 1/72533* (2013.01); *H04M 11/00* (2013.01); *H04M 11/04* (2013.01); *B60R 2025/0405* (2013.01); *B60R 2025/0415* (2013.01); *B60R 2025/1013* (2013.01); *B60R 2325/205* (2013.01); *G08C 2201/93* (2013.01); *H04Q 9/00* (2013.01)
(58) Field of Classification Search
  CPC ........ G08G 1/16; G08G 1/0967; G08G 1/167; G08G 1/165; G08G 1/166; G08G 5/0021; G08G 5/0078; G08G 5/0091; G08G 5/045; G08G 5/0086; B60W 30/12; B60W 30/09; B60W 50/087; B60W 50/10; B60W 50/14; B60W 30/143; B60W 50/16; B60R 25/04; B60R 1/00; B60R 25/104; B60R 25/31; B60R 25/32; B60R 2025/0405; B60R 2025/0415; B60R 2025/1013; B60R 2325/205; B62D 1/046; B62D 15/0265; B62D 15/025; F41H 7/005; F41H 11/16; F41H 11/28; F42B 33/06; F42D 5/04; G05D 1/0022; G05D 1/0061; B62H 5/20; B62M 6/45; G08C 17/00; G08C 2201/93; H04M 1/72533; H04M 11/00; H04M 11/04; H04Q 9/00

See application file for complete search history.

(56) References Cited

U.S. PATENT DOCUMENTS

| | | | | |
|---|---|---|---|---|
| 2010/0321173 | A1* | 12/2010 | Magner | G07C 9/00182 340/426.1 |
| 2011/0115617 | A1* | 5/2011 | Bennett | B60Q 1/50 340/439 |
| 2011/0181728 | A1* | 7/2011 | Tieman | B60R 1/00 348/148 |
| 2014/0020049 | A1* | 1/2014 | Smith, III | G06F 21/121 726/1 |

FOREIGN PATENT DOCUMENTS

| | | |
|---|---|---|
| JP | 2005-75302 A | 3/2005 |
| JP | 2006-273142 A | 10/2006 |
| JP | 2006-302018 A | 11/2006 |
| JP | 2006-322186 A | 11/2006 |
| JP | 2008-265676 A | 11/2008 |
| JP | 2013-150233 A | 8/2013 |
| JP | 2013-211693 A | 10/2013 |

OTHER PUBLICATIONS

An English translation of the Written Opinion of PCT/JP2017/030242 dated Oct. 3, 2017.

Chinese Office Action dated Jun. 6, 2019 in a counterpart Chinese Patent application.

\* cited by examiner

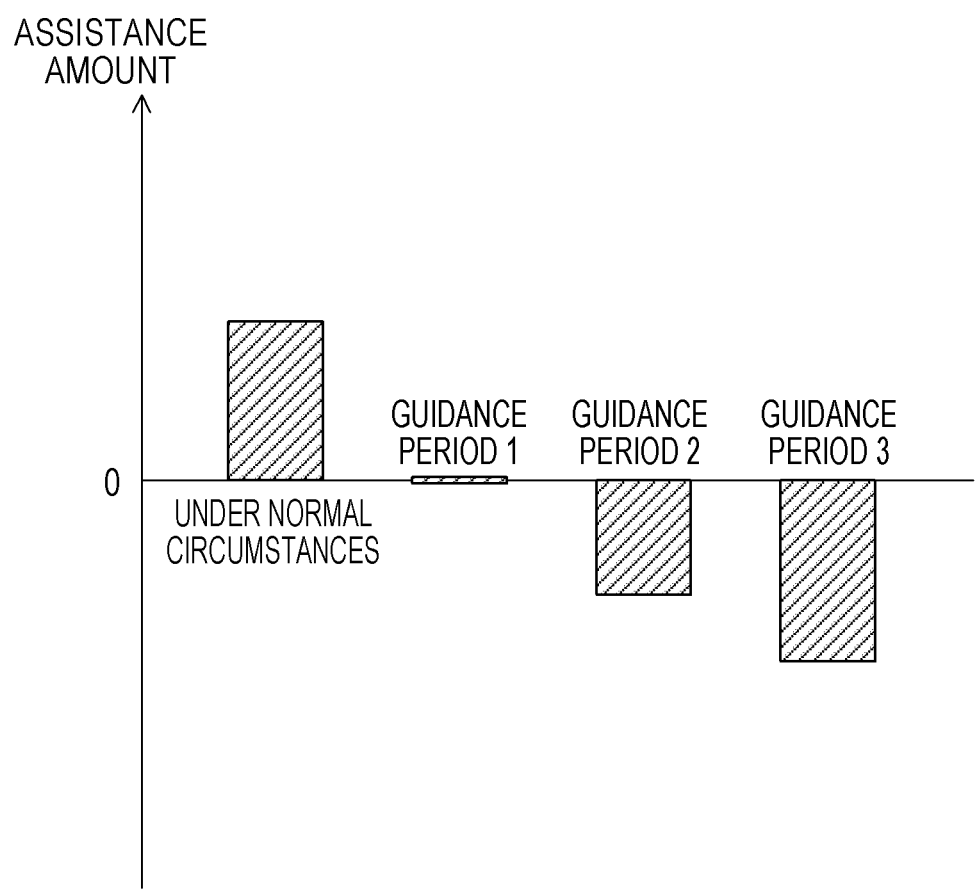

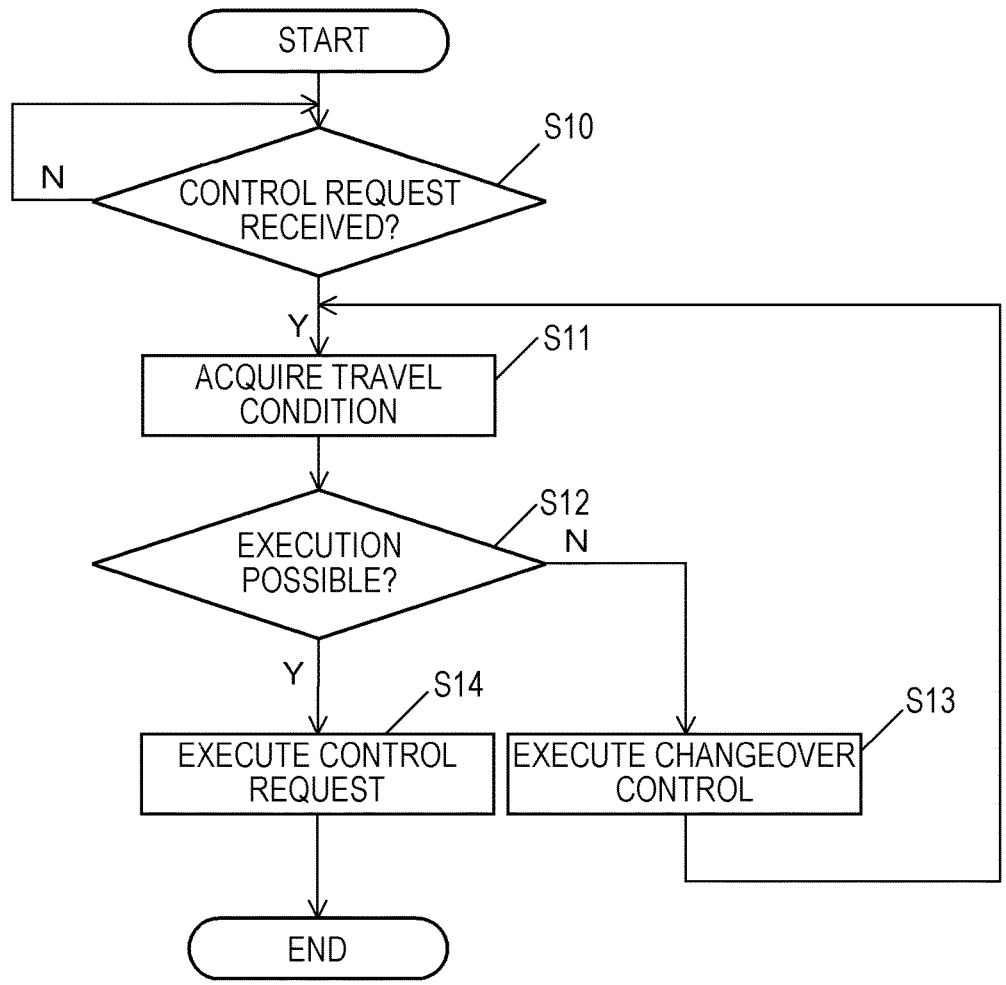

CONTROL DEVICE, CONTROL METHOD, PROGRAM, AND CONTROL SYSTEM

TECHNICAL FIELD

The present invention relates to a technique for controlling a vehicle from the exterior of the vehicle.

BACKGROUND ART

In vehicle sharing businesses for bicycles, automobiles, and so on, theft is a big problem. In a known technique employed in a vehicle sharing business, when theft of a vehicle is detected by a system or system operator, the engine is stopped by remote control. According to this technique, by controlling the vehicle remotely at an early stage after theft of the vehicle is detected, a situation in which the vehicle is abandoned in a remote location can be avoided, and the vehicle can be recovered easily.

CITATION LIST

Patent Literature

PTL 1: Japanese Patent Application Publication No. 2006-302018
PTL 2: Japanese Patent Application Publication No. 2013-150233

SUMMARY OF INVENTION

Technical Problem

However, in the remote control of the prior art, a vehicle occupant or a third party on the periphery of the vehicle may be exposed to danger as a result of the sudden control. For example, when a bicycle is stopped suddenly by remote control, the bicycle may fall, and as a result, not only the occupant but also peripheral third parties may be exposed to danger. It is therefore necessary to ensure the safety of the vehicle occupant and peripheral third parties when the vehicle is controlled remotely.

The present invention has been designed in consideration of the problem described above, and an object thereof is to provide a technique for controlling a vehicle from the exterior of the vehicle while ensuring the safety of an occupant of the vehicle and securing safety on the periphery thereof.

Solution to Problem

A control device for controlling a vehicle in accordance with a control request transmitted from an exterior of the vehicle, the control device comprising: an acquisition unit configured to acquire a condition of the vehicle upon reception of the control request; an execution ability determination unit configured to determine whether or not the acquired condition of the vehicle is a condition in which the control request can be executed safely; an execution control unit configured to execute the control request when the condition of the vehicle is determined to be a condition in which the control request can be executed safely; and a changeover control unit configured to implement control to change over the condition of the vehicle to a condition in which the control request can be executed safely, wherein, when the execution ability determination unit determines that the vehicle is in a condition where the control request cannot be executed safely, the changeover control unit is activated, and after the execution ability determination unit determines that the vehicle is in a condition where the control request can be executed safely, the execution control unit executes the control request.

The vehicle includes a bicycle, an automobile, a motorcycle, and so on. Further, the control request is a request to control the vehicle from the exterior of the vehicle. For example, the control request is a request to stop the vehicle. The control request may also be a request to display a warning image or a warning message on a vehicle-mounted display. Furthermore, the condition of the vehicle is information used to determine whether or not the control request can be executed safely. For example, the condition of the vehicle is information indicating a speed of the vehicle, presence or absence of an occupant, and so on.

The execution ability determination unit has a function for determining whether or not the control request can be executed safely in accordance with the condition of the vehicle. For example, the vehicle is in a condition where the control request can be executed safely when the speed of the vehicle is no higher than a threshold, none rides the vehicle, and so on.

When the content of the control request is "displaying a warning on a vehicle-mounted display", the control request can be executed safely regardless of the condition of the vehicle, and therefore the execution ability determination unit may determine that the control request can be executed at all times.

The execution control unit executes the control request when the execution ability determination unit determines that the vehicle is in a condition where the control request can be executed safely. For example, the execution control unit locks a wheel of the bicycle.

On the other hand, the changeover control unit implements changeover control for changing over the condition of the vehicle to a condition in which the control request can be executed safely when the vehicle is determined to be in a condition where the control request cannot be executed safely. Here, the changeover control is control for changing over the condition of the vehicle to a condition in which the control request can be executed safely. For example, the changeover control unit prompts a user to stop the bicycle by implementing control for applying negative assistance to a pedaling operation performed on the bicycle.

Further, the execution control unit executes the control request when the vehicle is determined to be in a condition where the control request can be executed safely after initially being determined to be in a condition where the control request cannot be executed safely. Hence, with the control device according to the present invention, a vehicle can be controlled from the exterior of the vehicle while ensuring the safety of an occupant of the vehicle and securing safety on the periphery thereof.

The execution ability determination unit may determine that the vehicle is in a condition where the control request can be executed safely when a travel speed of the vehicle is no higher than a threshold, and determine that the vehicle is in a condition where the control request cannot be executed safely when the travel speed of the vehicle is higher than the threshold. Thus, a situation in which the control request is executed suddenly during vehicle travel can be avoided, and as a result, the safety of the vehicle occupant and safety on the periphery thereof can be secured.

The control device may further include an imaging unit for capturing an image of a periphery of the vehicle, and the execution ability determination unit may determine that the control request can be executed safely after determining on the basis of the captured image that the periphery of the vehicle is safe, and determine that the control request cannot be executed safely after determining on the basis of the captured image that the periphery of the vehicle is unsafe.

The imaging unit is a camera, for example. The execution ability determination unit determines that the periphery of the vehicle is safe when, for example, an image captured by the camera shows the shoulder of a road. By determining conditions on the periphery of the vehicle, a situation in which the control request is executed in a dangerous location can be avoided.

The execution ability determination unit may determine that the vehicle is in a condition where the control request can be executed safely when a user rides the vehicle, and determine that the vehicle is in a condition where the control request cannot be executed safely when no user rides the vehicle. More specifically, the execution ability determination unit may determine whether or not a user rides the vehicle using a sensor disposed on a seat portion of the vehicle. In so doing, the safety of the vehicle user can be ensured.

The vehicle may be a bicycle, and the execution ability determination unit may determine that the vehicle is in a condition where the control request can be executed safely when a stand that supports the bicycle in a standing attitude is in use, and determine that the vehicle is in a condition where the control request cannot be executed safely when the stand is not in use. In so doing, it is possible to determine more reliably whether or not the vehicle is in use.

The vehicle may include an image generator or a voice generator, and when the condition of the vehicle is a condition in which the control request cannot be executed safely, the changeover control unit may generate an image or a voice prompting a user of the vehicle to change over to a condition in which the control request can be executed safely using the image generator or the voice generator. For example, the changeover control unit may display a message requesting that the vehicle be stopped on a display of a navigation system. In so doing, the user can be prompted to stop the vehicle without executing physical control on the vehicle.

The vehicle may be a bicycle having an assistance function for assisting self-propulsion, and when the condition of the vehicle is a condition in which the control request cannot be executed safely, the changeover control unit may implement control for suppressing self-propulsion using the assistance function. The assistance function is a function for assisting a driving operation performed by the user using power generated by a driving device. More specifically, the assistance function may be a function for assisting the pedaling operation performed by the user.

The changeover control unit may suppress the pedaling operation performed by the user by setting an assistance amount provided by the assistance function at a negative value. In so doing, the user can be prompted to stop the bicycle effectively.

When the condition of the vehicle is a condition in which the control request cannot be executed safely, the changeover control unit may implement control for increasing an amount by which self-propulsion is suppressed in stages using the assistance function. In so doing, sudden control can be avoided, and as a result, the safety of the vehicle occupant and safety on the periphery of the vehicle can be secured more reliably.

When the condition of the vehicle is a condition in which the control request cannot be executed safely, the changeover control unit may display a warning on a display unit, indicating that control for suppressing self-propulsion is to be implemented, and then implement the control for suppressing self-propulsion using the assistance function following the elapse of a predetermined time. In so doing, the vehicle user can be notified in advance that the vehicle is to be controlled, and as a result, the safety of the vehicle occupant and safety on the periphery of the vehicle can be secured.

Note that the present invention may also be interpreted as a control device having at least a part of the configurations and functions described above, or a vehicle having this control device. The present invention may also be interpreted as a vehicle control method including at least a part of the processing described above. The present invention may also be interpreted as a program for causing a computer (a processor) to execute respective steps of this method, or a computer-readable recording medium that stores the program non-temporarily. Note that the means and processing described above may be implemented in any desired combinations as long as no technical contradictions arise as a result.

Advantageous Effects of Invention

According to the present invention, a vehicle can be controlled from the exterior of the vehicle while securing the safety of an occupant of the vehicle and securing safety on the periphery thereof.

BRIEF DESCRIPTION OF DRAWINGS

FIG. 2 is a view showing examples of assistance amount control patterns.

FIG. 3A is a view showing a first example of a flow of remote control executed on an electrically assisted bicycle, and FIG. 3B is a view showing examples of control requests and execution ability determination rules.

DESCRIPTION OF EMBODIMENTS

Figure 1A:
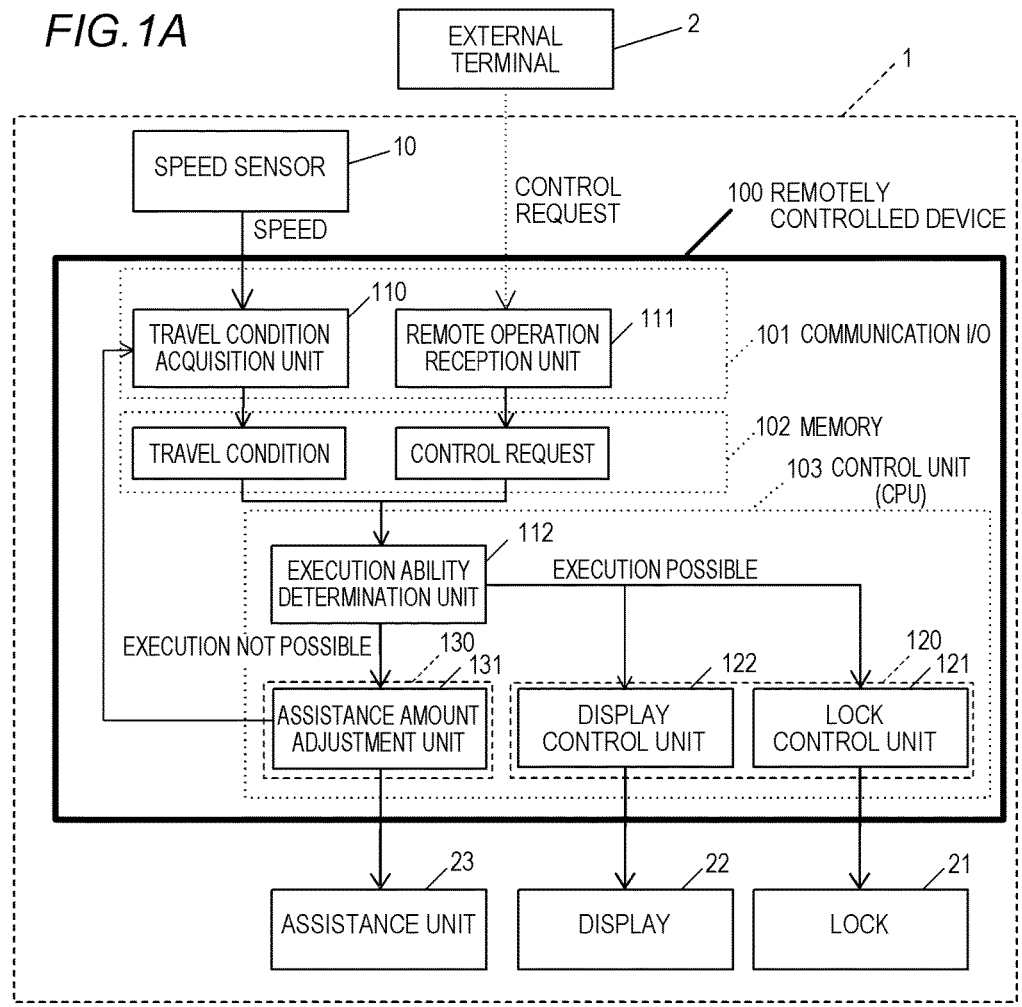
FIG. 1A is a block diagram showing a functional configuration of a remotely controlled device according to a first embodiment.

The present invention relates to remote control of a vehicle, and more particularly to securing safety when controlling a vehicle.

First Embodiment

<Outline of Device>

A remotely controlled device 100 according to a first embodiment is a device for controlling travel by an electrically assisted bicycle 1 upon reception a control request from an external terminal 2 by controlling a lock 21, a display 22, or an assistance unit 23 in accordance with a travel condition of the bicycle. Note that the electrically assisted bicycle 1 serves as an example of a vehicle.

Figure 1B:
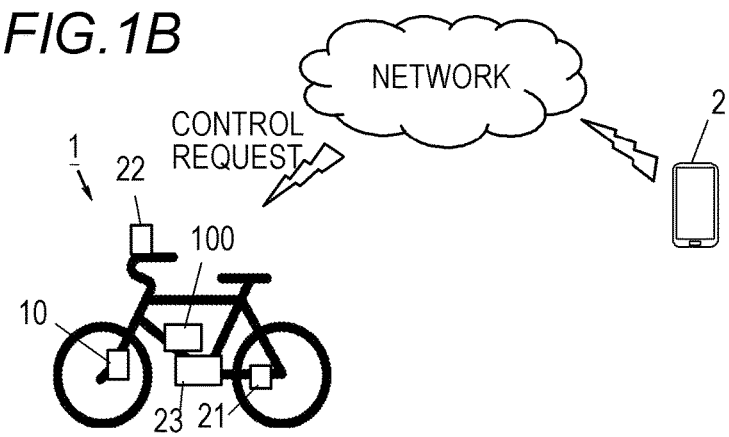
FIG. 1B is a pattern diagram showing an overall configuration of a remote control system.

FIG. 1A is a block diagram showing a functional configuration of the remotely controlled device 100 according to the first embodiment, and FIG. 1B is a pattern diagram showing an overall configuration of a remote control system.

As shown in FIG. 1A, the remotely controlled device 100 includes a travel condition acquisition unit 110, a remote operation reception unit 111, an execution ability determination unit 112, an execution control unit 120, and a changeover control unit 130. Further, the execution control unit 120 includes a lock control unit 121 and a display control unit 122. Furthermore, the changeover control unit 130 includes an assistance amount adjustment unit 131.

The remotely controlled device 100 is constituted by a computer having a communication I/O 101, a memory 102, a CPU (a processor) 103, and so on, for example. The execution ability determination unit 112, lock control unit 121, display control unit 122, and assistance amount adjustment unit 131 shown in FIG. 1A are realized by having the CPU 103 (a control unit) execute a required program.

As shown in FIG. 1B, the external terminal 2 may communicate with the remotely controlled device 100 over a network.

Further, a speed sensor 10, the lock 21, the display 22, the assistance unit 23, and the remotely controlled device 100 are vehicle-mounted facilities mounted on the electrically assisted bicycle 1.

The remote operation reception unit 111 has a function for receiving a control request from the external terminal 2. In other words, the remote operation reception unit 111 is constituted by the communication I/O 101 when receiving the control request from the external terminal 2.

The external terminal 2 is a portable terminal such as a smartphone, a tablet PC or a laptop PC, for example. An application for transmitting the control request to the electrically assisted bicycle 1 is installed in the external terminal 2.

The control request is a request to control a vehicle from the exterior of the vehicle. For example, the control request is a request to stop the electrically assisted bicycle 1 using the lock 21. The control request may also be a request to display a warning to an occupant on the display 22.

Note that the display 22 serves as an example of image generating means. The control request may also be a request to issue a warning to the occupant by voice through a speaker, not shown in the figures. The speaker serves as an example of voice generating means.

When the application is activated by a user, the external terminal 2 displays a user interface on which to select a control request on a monitor. For example, the external terminal 2 displays two buttons on the user interface, corresponding respectively to a control request for operating the lock 21 and a control request for displaying a warning on the display 22.

When the electrically assisted bicycle 1 has been stolen and the user presses one or both of the two buttons, the external terminal 2 transmits the control request corresponding to the pressed button.

The remote operation reception unit 111 receives the control request, and records the control request in the memory 102.

The travel condition acquisition unit 110 has a function for receiving a travel condition from various sensors mounted on the electrically assisted bicycle 1. The travel condition acquisition unit 110 is constituted by the communication I/O 101 receiving the control request from the speed sensor 10. In the example of FIG. 1A, the travel condition acquisition unit 110 receives speed information (m/s) from the speed sensor 10 as the travel condition. The travel condition acquisition unit 110 records the speed information (the travel condition) in the memory 102.

For example, the speed sensor 10 is a cadence sensor. The speed sensor 10 measures a number of times a magnet disposed on a front wheel or a rear wheel of the electrically assisted bicycle 1 passes a predetermined position over a unit time. Next, the speed sensor 10 calculates the speed of the electrically assisted bicycle 1 by multiplying the number of times the magnet passes the predetermined position per unit time by the length of an outer circumference of the wheel.

Note that the speed sensor 10 is not limited to a cadence sensor. For example, the speed sensor 10 may calculate the speed by calculating a movement distance per unit time using GPS (Global Positioning System). Alternatively, the speed sensor 10 may calculate the speed by integrating an acceleration using an acceleration sensor.

The travel condition acquisition unit 110 acquires speed information from the speed sensor 10 upon reception of a control request from the external terminal 2, and transmits the speed information to the execution ability determination unit 112. Note that the travel condition acquisition unit 110 may acquire the speed information and transmit the acquired speed information to the execution ability determination unit 112 periodically at predetermined time intervals.

The execution ability determination unit 112 has a function for determining whether or not the control request can be executed safely in accordance with the travel condition of the electrically assisted bicycle 1. The execution ability determination unit 112 acquires the control request and the speed information (the travel condition) recorded in the memory 102. After determining that execution is possible, the execution ability determination unit 112 shifts the processing to the execution control unit 120. After determining that execution is not possible, on the other hand, the execution ability determination unit 112 shifts the processing to the changeover control unit 130.

A determination reference used by the execution ability determination unit 112 differs according to the type of the control request. A determination reference used when the control request is a request to lock the electrically assisted bicycle will be described. In this specification, "locking" means forcibly stopping or activating a part of the functions required to operate the vehicle, thereby setting the vehicle in an inoperable condition.

For example, when the speed of the electrically assisted bicycle 1 is lower than 1 m/s, for example, the execution ability determination unit 112 determines that the control request can be executed safely, and shifts the processing to the lock control unit 121. When the speed of the electrically assisted bicycle 1 is higher than 1 m/s, on the other hand, the execution ability determination unit 112 determines that the control request cannot be executed safely, and shifts the processing to the assistance amount adjustment unit 131.

Note that although the execution ability determination unit 112 determines whether or not the control request can be executed using a speed of 1 m/s as a boundary, the present invention is not limited thereto. For example, the execution ability determination unit 112 may determine whether or not the control request can be executed using a speed of 0 m/s as a boundary.

For example, the execution ability determination unit 112 may determine that the control request can be executed when the speed of the electrically assisted bicycle 1 is 0, and may determine that the control request cannot be executed when the speed of the electrically assisted bicycle 1 is higher than 0. In other words, the execution ability determination unit 112 may determine whether or not the control request can be executed according to whether or not the electrically assisted bicycle 1 is stopped.

Next, a determination reference used when the control request is a warning will be described. The warning is a notification issued to the occupant of the bicycle to prompt the occupant to stop the vehicle. When the control request is a warning, the execution ability determination unit 112 may determine whether or not the control request can be executed safely regardless of the travel condition of the electrically assisted bicycle 1.

The lock control unit 121 has a function for executing the control request by controlling the lock 21 when the execution ability determination unit 112 determines that the control request can be executed safely.

For example, the lock 21 is a wheel lock for preventing the wheel of the electrically assisted bicycle 1 from rotating. The lock 21 may also be a steering lock that fixes handle bars in a predetermined position. The lock 21 may also be a brake lock that controls a brake of the electrically assisted bicycle 1 to a constantly applied condition. Furthermore, the lock 21 may be fixed to a pedal of the electrically assisted bicycle 1, or a device that causes the pedals to spin so that the electrically assisted bicycle 1 can no longer travel. Moreover, the lock 21 may be a device that executes control for reducing the air pressure of a tire of the electrically assisted bicycle 1.

The assistance amount adjustment unit 131 has a function for executing control to suppress self-propulsion by the electrically assisted bicycle 1 using a function of the assistance unit 23 when the execution ability determination unit 112 determines that the control request cannot be executed safely.

The assistance unit 23 is a device for assisting self-propulsion by providing the electrically assisted bicycle 1 with driving force under normal circumstances. The assistance unit 23 includes a motor, a control circuit, a speed sensor, a torque sensor, and so on. Under normal circumstances, the assistance unit 23 determines an assistance amount on the basis of input acquired from the speed sensor and the torque sensor, and assists the pedaling operation performed by the occupant at an appropriate intensity by driving the motor in accordance with the assistance amount.

The assistance amount adjustment unit 131 executes control to suppress self-propulsion by the electrically assisted bicycle 1 by setting the assistance amount provided by the assistance unit 23 at a negative value when the execution ability determination unit 112 determines that the control request cannot be executed safely. In other words, the assistance amount adjustment unit 131 makes the pedaling operation heavier by controlling the assistance amount to a negative value. In so doing, the thief can be forced to abandon attempts to operate the electrically assisted bicycle 1 at an early stage.

The assistance amount adjustment unit 131 may also increase the negative assistance amount provided by the assistance unit 23 in stages over time. For example, for the first 10 minutes following reception of the control request, the assistance amount adjustment unit 131 adjusts the negative assistance amount provided by the assistance unit 23 to a rather small value. Next, from 10 to 20 minutes following reception of the control request, the assistance amount adjustment unit 131 adjusts the negative assistance amount provided by the assistance unit 23 to an intermediate value. Next, from 20 minutes onward following reception of the control request, the assistance amount adjustment unit 131 adjusts the negative assistance amount provided by the assistance unit 23 to a maximum value.

In so doing, danger caused by sudden vehicle control can be prevented. For example, a situation in which the assistance amount is suddenly set at a large negative value during uphill travel or the like such that the occupant falls off can be prevented from occurring.

Note that the present invention is not limited to a case in which the assistance amount provided by the assistance unit 23 is set at a negative value, and instead, the assistance amount adjustment unit 131 may control the assistance amount provided by the assistance unit 23 to zero.

FIG. 2 is a view showing examples of assistance amount control patterns. The vertical axis in FIG. 2 shows the assistance amount, and four assistance amount patterns are shown in the horizontal axis direction. The four assistance amount patterns shown in FIG. 2 will now be described in order from left to right.

The leftmost pattern shows the assistance amount under normal circumstances. Under normal circumstances, the assistance unit 23 assists the pedaling operation performed by the occupant by a positive assistance amount. Note that under normal circumstances, the assistance unit 23 may vary the assistance amount in accordance with conditions such as the incline angle of a slope.

The next pattern shows an assistance amount during a guidance period 1 in which the changeover control is executed. During the guidance period 1, the assistance amount is set at 0. In other words, the assistance unit 23 does not assist the pedaling operation performed by the occupant.

The next pattern shows an assistance amount during a guidance period 2 in which the changeover control is executed. During the guidance period 2, the assistance unit 23 suppresses the pedaling operation performed by the occupant by setting the assistance amount at a negative value.

The next pattern shows an assistance amount during a guidance period 3 in which the changeover control is executed. During the guidance period 3, the pedaling operation performed by the occupant is greatly suppressed by setting the assistance amount at a larger negative value than that of the guidance period 2.

For example, the assistance amount adjustment unit 131 may control the assistance unit 23 to the assistance amount of the guidance period 1, the guidance period 2, or the guidance period 3 when the execution ability determination unit 112 determines that the control request cannot be executed safely.

Further, in a case where the assistance amount adjustment unit 131 increases the negative assistance amount provided by the assistance unit 23 in stages over time, the assistance amount adjustment unit 131 controls the assistance unit 23 to the assistance amount of the guidance period 1 until 10 minutes elapse, for example. Then, once 10 minutes have elapsed, the assistance amount adjustment unit 131 controls the assistance unit 23 to the assistance amount of the guidance period 2 until 20 minutes elapse, and once 20 minutes have elapsed, the assistance amount adjustment unit 131 may control the assistance unit 23 to the assistance amount of the guidance period 3.

The display control unit 122 has a function for displaying an image or a message for warning the occupant on the display 22. The display 22 is a device for displaying information such as the speed, traveled distance and position of the electrically assisted bicycle 1 under normal circumstances.

As described above, the execution ability determination unit 112 determines that the control request can be executed safely regardless of the travel condition of the electrically assisted bicycle 1. Accordingly, the display control unit 122 may display a warning on the display 22 permanently after receiving the control request (a warning). For example, the display control unit 122 may display a message saying, "Only the user is permitted to ride this bicycle" on the display 22.

Further, the display control unit 122 may modify the image or message displayed on the display 22 in accordance with the determination result obtained by the execution ability determination unit 112.

When the execution ability determination unit 112 determines that the control request cannot be executed safely, the remotely controlled device 100 may execute changeover control following a predetermined time after a display indicating the content of the changeover control is displayed on the display 22.

For example, when the execution ability determination unit 112 determines that the control request cannot be executed safely, first, the display control unit 122 displays a message saying, "The pedals will become heavier after a predetermined time" on the display 22. Then, following the elapse of the predetermined time, the assistance amount adjustment unit 131 adjusts the assistance amount provided by the assistance unit 23 to a negative value.

In other words, the display control unit 122 may display the time remaining until the changeover control is executed on the display 22. Then, when the time displayed on the display elapses, the changeover control unit 130 may execute the changeover control.

In so doing, the occupant can be notified in advance that the changeover control is to be executed, and as a result, accidents caused by the changeover control can be prevented.

<Processing Flowcharts>

FIGS. 3A and 3B are views showing a first example of a flow of remote control executed on the electrically assisted bicycle 1.

As shown in FIG. 3A, in step S10, the remote operation reception unit 111 determines whether or not a control request has been received from the external terminal 2. As shown in FIG. 3B, locking and a warning, for example, are used as types of control requests.

When a control request has been received, the travel condition acquisition unit 110 acquires the travel condition in step S11. For example, the travel condition acquisition unit 10 acquires the speed (m/s) of the electrically assisted bicycle 1 from the speed sensor 10 as the travel condition.

Next, in step S12, the execution ability determination unit 112 determines whether or not the control request can be executed safely.

As shown in FIG. 3B, for example, when the control request indicates locking and the speed of the electrically assisted bicycle 1 is lower than 1 m/s, the execution ability determination unit 112 determines that the control request can be executed. When the speed of the electrically assisted bicycle 1 equals or exceeds 1 m/s, on the other hand, the execution ability determination unit 112 determines that the control request cannot be executed safely.

Further, when the control request indicates a warning, the execution ability determination unit 112 determines that the control request can be executed safely regardless of the speed of the electrically assisted bicycle 1.

Returning to FIG. 3A, when the execution ability determination unit 112 determines in step S12 that the control request cannot be executed safely, the changeover control unit 130 executes the changeover control in step S13. For example, the assistance amount adjustment unit 131 controls the assistance amount provided by the assistance unit 23 to a negative value.

Next, in step S11, the travel condition acquisition unit 110 acquires the travel condition (the speed) again, whereupon the execution ability determination unit 112 determines whether or not the control request can be executed safely in step S12.

When the execution ability determination unit 112 determines in step S12 that the control request can be executed safely, the execution control unit 130 executes the control request in step S14.

For example, when the control request indicates locking, the lock control unit 121 locks the wheel of the electrically assisted bicycle 1 by controlling the lock 21. Further, when the control request indicates a warning, the display control unit 122 displays an image or a message for warning the occupant on the display 22.

Figure 4:
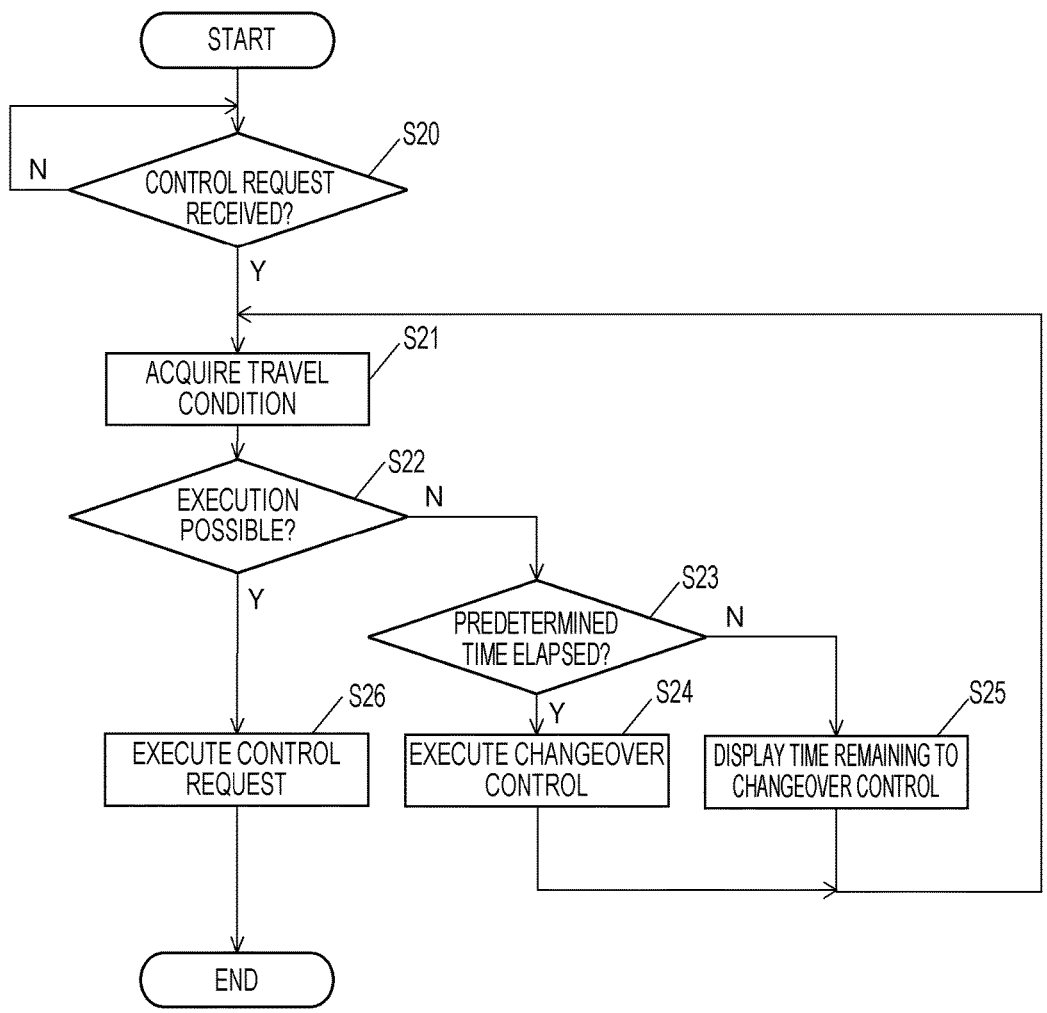
FIG. 4 is a view showing a second example of a flow of remote control executed on an electrically assisted bicycle.

FIG. 4 is a view showing a second example of a flow of remote control executed on the electrically assisted bicycle 1. FIG. 4 illustrates an example in which the assistance amount is controlled following the elapse of a predetermined time after displaying the time remaining to the changeover control on the display 22.

In step S20, the remote operation reception unit 111 determines whether or not a control request has been received from the external terminal 2. When a control request has been received, the travel condition acquisition unit 110 acquires the travel condition (the speed) in step S21.

Next, in step S22, the execution ability determination unit 112 determines whether or not the control request can be executed safely. When the execution ability determination unit 112 determines in step S22 that the control request cannot be executed safely, the changeover control unit 130 determines whether or not a predetermined time has elapsed in step S23.

When it is determined that the predetermined time has elapsed, the changeover control unit 130 executes the changeover control in step S24. For example, the assistance amount adjustment unit 131 controls the assistance amount provided by the assistance unit 23 to a negative value.

When it is determined that the predetermined time has not elapsed, on the other hand, the display control unit 122 displays the time remaining until the changeover control is executed on the display 22 in step S25. For example, the display control unit 122 may display a message saying, "In 5 minutes, the pedals will become heavier" on the display 22.

Next, in step S21, the travel condition acquisition unit 110 acquires the travel condition (the speed) again, whereupon the execution ability determination unit 112 determines whether or not the control request can be executed safely in step S22.

Furthermore, every time the processing of step S25 is executed, the display control unit 122 may update the "time remaining until the changeover control is executed", and display the updated time on the display 22.

For example, when the processing of step S25 is executed in a first loop, the display control unit 122 displays the message saying, "In 5 minutes, the pedals will become heavier" on the display 22. Then, when the processing of step S25 is executed in a second loop, the display control unit 122 displays a message saying, "In 4 minutes and 59 seconds, the pedals will become heavier" on the display 22. Then, when the processing of step S25 is executed in a third loop, the display control unit 122 displays a message saying, "In 4 minutes and 58 seconds, the pedals will become heavier" on the display 22.

By updating the time remaining until the changeover control is executed and displaying the updated time in this manner, the danger of the occupant falling off when the changeover control is underway can be avoided.

Next, when the execution ability determination unit 112 determines that the control request can be executed safely, the execution control unit 130 executes the control request in step S26. For example, the execution control unit 130 executes locking or a warning.

According to the first embodiment, as described above, the remotely controlled device 100 determines whether or not the control request can be executed safely, and when the control request cannot be executed safely, implements control for changing over to a condition in which the control request can be executed safely. Further, when the condition of the vehicle is changed over after it is initially determined that the control request cannot be executed safely such that it is determined in a subsequent determination that the control request can now be executed safely, the execution control unit 120 executes the control request. As a result, the vehicle can be controlled from the exterior of the vehicle while ensuring the safety of the occupant of the vehicle and securing safety on the periphery thereof.

Modified Examples of First Embodiment

In the first embodiment, the execution ability determination unit 112 determines whether or not the control request can be executed safely on the basis of speed information, but the present invention is not limited thereto, and instead, the execution ability determination unit 112 may determine whether or not the control request can be executed safely depending on whether or not the electrically assisted bicycle 1 is occupied.

For example, a weight sensor is disposed on a saddle portion of the electrically assisted bicycle 1. The weight sensor detects the weight of the occupant. In this case, the travel condition acquisition unit 110 acquires the weight as the travel condition.

When the weight is equal to or lower than a predetermined value, this means that the electrically assisted bicycle 1 is unoccupied, and therefore the execution ability determination unit 112 determines that the control request can be executed safely. When the weight is equal to or higher than a predetermined value, on the other hand, this means that the electrically assisted bicycle 1 is occupied, and therefore the execution ability determination unit 112 determines that the control request cannot be executed.

Note that a contact sensor may be disposed on the saddle portion of the electrically assisted bicycle 1 instead. In this case, the execution ability determination unit 112 may determines whether or not the control request can be executed safely according to whether or not contact has been made with the saddle portion.

Further, in the first embodiment, a wheel lock, a steering lock, and so on were cited as examples of the control request, but the present invention is not limited thereto. For example, the control request may be a request to set the assistance amount provided by the assistance unit 23 at a large negative value.

Alternatively, the control request may be a request to issue a warning such as a voice, vibration, or an image to the occupant. In this case, the remotely controlled device 100 may use the display 22 or the speaker (not shown). Note that the display serves as an example of the image generating means, while the speaker serves as an example of the voice generating means.

Alternatively, the control request may be a request to generate a strong light from a light emitting device disposed on the electrically assisted bicycle 1. The control request may also be a request to issue a warning to people on the periphery.

Furthermore, in the first embodiment, an example in which the remotely controlled device 100 is used in the electrically assisted bicycle 1 was described, but the present invention is not limited thereto, and the remotely controlled device 100 may be used in an automobile, for example.

In this case, the control request may be a request to activate an airbag installed in the automobile. In so doing, the automobile can be set in an inoperable condition.

Further, the control request includes various other requests for setting an automobile in an inoperable condition by stopping an engine of the automobile, activating a steering lock, executing steering control, deactivating an accelerator, locking a door, controlling a brake, and so on.

The control request may also be a request to gradually reduce the travel speed of the automobile. With this control request, sudden control is not applied, and therefore the control request can be executed comparatively safely even when executed during travel.

Furthermore, the execution ability determination unit 112 may determine whether or not the control request can be executed safely on the basis of the speed of the automobile and an image of the periphery of the automobile, captured by a camera or the like.

For example, the travel condition acquisition unit 110 acquires the speed of the automobile from a speed sensor. Further, the travel condition acquisition unit 110 acquires an image of the periphery of the automobile from a camera mounted in the automobile. The execution ability determination unit 112 then determines that the control request can be executed safely when the speed of the automobile is 0 and the automobile is in a safe location. For example, the execution ability determination unit 112 determines that the control request can be executed safely when the automobile is parked on the shoulder of a road.

Second Embodiment

In a second embodiment, an example of a control system 5 for controlling a remotely controlled device 200 from the exterior of a vehicle in accordance with a control request from a management device 300 that manages an electrically assisted bicycle 1 will be described.

Figure 5:
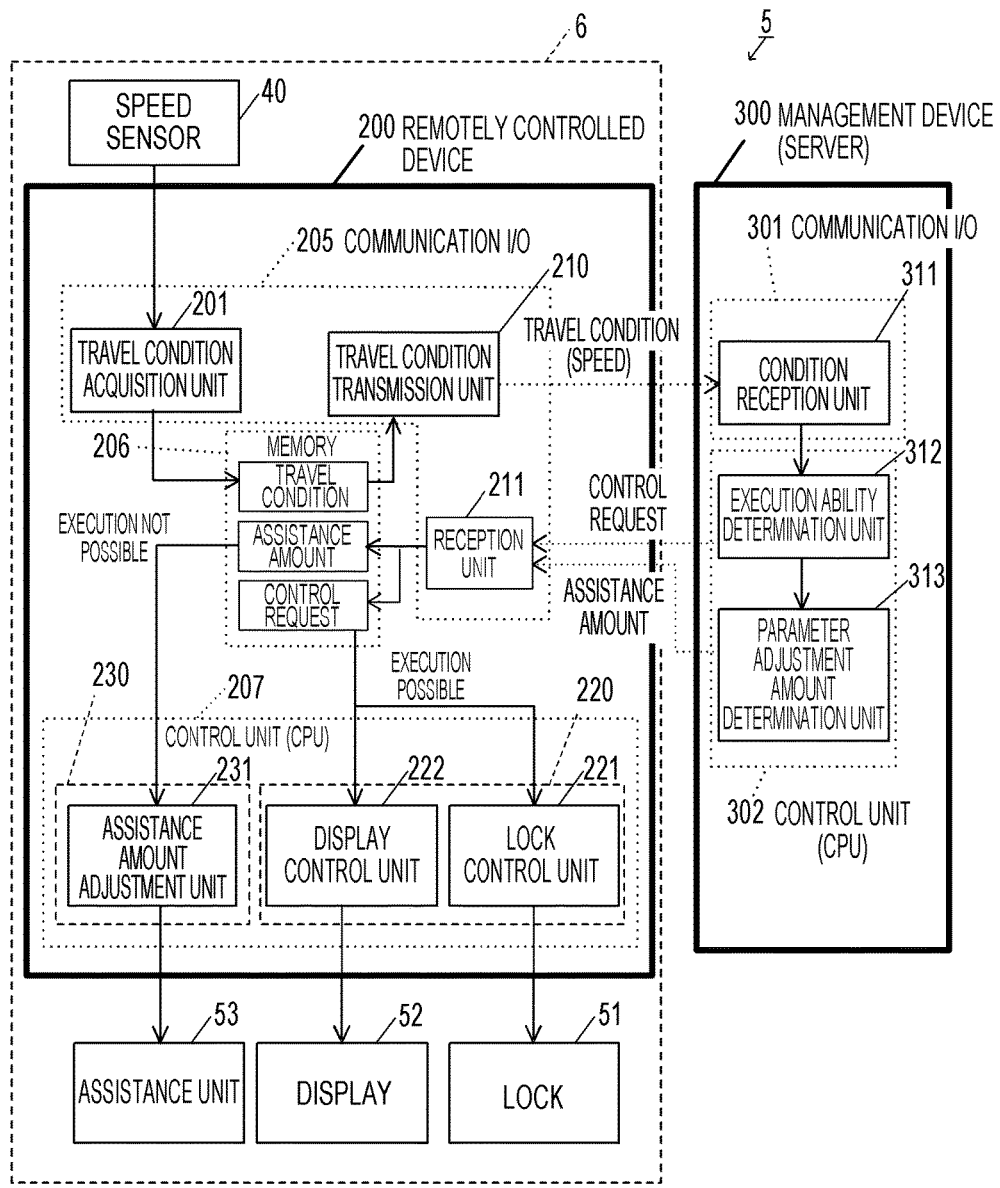
FIG. 5 is a block diagram showing a functional configuration of a control system according to a second embodiment.

FIG. 5 is a block diagram showing a functional configuration of the control system according to the second embodiment.

The control system 5 includes the remotely controlled device 200 and the management device (a server) 300. The remotely controlled device 200 and the management device 300 are capable of communication. The communication may be performed over a network.

The electrically assisted bicycle 6 includes a speed sensor 40, a lock 51, a display 52, an assistance unit 53, and the remotely controlled device 200. Further, the remotely controlled device 200 includes a travel condition acquisition unit 201, a travel condition transmission unit 210, a reception unit 211, an execution control unit 220, and a changeover control unit 230.

Furthermore, the execution control unit 220 includes a lock control unit 221 and a display control unit 222. Moreover, the changeover control unit 230 includes an assistance amount adjustment unit 231.

The remotely controlled device 200 is constituted by a computer having a communication I/O 205, a memory 206, a CPU 207, and so on, for example. The lock control unit 221, display control unit 222, and assistance amount adjustment unit 231 shown in FIG. 5 are realized by having the CPU 220 (a control unit) execute a required program.

The travel condition acquisition unit 201 receives speed information from the speed sensor 40 as the travel condition. Next, the travel condition acquisition unit 201 records the speed information (the travel condition) in the memory 206. Next, the travel condition transmission unit 210 transmits the speed information recorded in the memory 206 to the management device 300. Note that the travel condition may be constituted by information other than speed information (information such as whether or not the electrically assisted bicycle 6 is occupied).

The travel condition transmission unit 210 may transmit the speed information to the management device 300 after detecting that the electrically assisted bicycle 6 has been stolen.

The management device 300 includes a condition reception unit 311, an execution ability determination unit 312, and a parameter adjustment amount determination unit 313. Note that the condition reception unit 311 is constituted by a communication I/O 301. Further, the execution ability determination unit 312 and the parameter adjustment amount determination unit 313 are realized by having a CPU 302 (a control unit) execute a required program. The management device 300 also includes a memory, not shown in the figures.

The condition reception unit 311 receives the speed information from the remotely controlled device 200. Next, the condition reception unit 311 records the speed information in the memory, not shown in the figures. Next, the execution ability determination unit 312 determines whether or not the control request can be executed safely in accordance with the speed information recorded in the memory.

For example, the execution ability determination unit 312 determines that the control request can be executed safely when the speed of the electrically assisted bicycle 6 is lower than 1 m/s. When the speed of the electrically assisted bicycle 6 equals or exceeds 1 m/s, on the other hand, the execution ability determination unit 312 determines that the control request cannot be executed safely.

The execution ability determination unit 312 transmits the control request to the remotely controlled device 200 via a communication I/O, not shown in the figures, in accordance with the determination result. The execution ability determination unit 312 transmits the control request to the remotely controlled device 200 after determining that the control request can be executed safely.

When the execution ability determination unit 312 determines that the control request cannot be executed safely, on the other hand, the parameter adjustment amount determination unit 313 determines a parameter adjustment amount to be used during the changeover control. For example, the parameter adjustment amount determination unit 313 determines a negative assistance amount for the assistance amount adjustment unit 231. Next, the parameter adjustment amount determination unit 313 transmits the determined parameter (the negative assistance amount) to the remotely controlled device 200 via a communication I/O, not shown in the figures.

The reception unit 211 receives the control request or the assistance amount. The reception unit 211 records the assistance amount and the control request in the memory 206. When the reception unit 211 receives the control request from the management device 300, the lock control unit 221 locks the wheel of the electrically assisted bicycle 6 by controlling the lock 51 in accordance with the control request recorded in the memory 206. Note that the reception unit 211 is constituted by the communication I/O 205.

When the reception unit 211 receives the assistance amount from the management device 300, the assistance amount control unit 231 controls the assistance amount provided by the assistance unit 53 to a negative value on the basis of the negative assistance amount recorded in the memory 206.

In other words, in the second embodiment, when the execution ability determination unit 312 determines that the control request can be executed safely, the control request is transmitted from the management device 300, and when the execution ability determination unit 312 determines that the control request cannot be executed safely, the assistance amount is transmitted.

Further, the display control unit 222 displays a warning image or a warning message on the display 52 when either the control request or the assistance amount is received.

According to the second embodiment, as described above, the control system 5 controls the remotely controlled device 200 automatically under the management of the management device 300. As a result, a delay in control of the vehicle can be avoided.

Note that in the second embodiment, a case in which the parameter adjustment amount determination unit 313 determines the negative assistance amount when the changeover control is to be executed was described, but the present invention is not limited thereto. For example, the management device 300 may transmit only the determination result indicating whether or not the control request can be executed safely. In this case, when the reception unit 211 receives a determination result indicating that the control request cannot be executed safely, the assistance amount adjustment unit 231 may control the assistance unit 53 using a preset negative assistance amount.

Note that in the embodiments described above, examples of changeover control in which the assistance amount is adjusted to a negative value were described, but the present invention is not limited thereto. For example, the display control unit 122 may prompt the occupant to stop the vehicle by displaying a message indicating that only the user is permitted to ride the bicycle on the display 22 as the changeover control.

Note that the embodiments described above are merely examples for illustrating the present invention, and the present invention may be implemented by appropriately modifying or combining the embodiments within a scope that does not depart from the spirit of the invention.

(Addition 1)

A control device for controlling a vehicle in accordance with a control request transmitted from an exterior of the vehicle, the control device including a hardware processor and a memory, the memory having:

a control request storage unit storing processing data corresponding to the control request for controlling the vehicle; and a travel condition storage unit storing processing data corresponding to changeover control for changing over a condition of the vehicle to a condition in which the control request can be executed safely, wherein the hardware processor acquires the condition of the vehicle when the control request is received from the exterior of the vehicle, determines whether or not the acquired condition of the vehicle is a condition in which the control request can be executed safely, executes the control request on the vehicle using the processing data corresponding to the control request in a case of determining that the vehicle is in a condition where the control request can be executed safely, and in a case of determining that the vehicle is in a condition where the control request cannot be executed safely, executes changeover control on the vehicle using the processing data corresponding to the changeover control, and when the execution ability determination unit determines that the control request can be executed safely, executes the control request using the processing data corresponding to the control request.

(Addition 2)

A control method for controlling a vehicle in accordance with a control request transmitted from an exterior of the vehicle, the method including:

a step of using at least one hardware processor to acquire a condition of the vehicle when the control request is received;

a step of using at least one hardware processor to determine whether or not the acquired condition of the vehicle is a condition in which the control request can be executed safely;

a step of using at least one hardware processor to execute the control request when the vehicle is determined to be in a condition where the control request can be executed safely; and a step of using at least one hardware processor to implement control for changing over the condition of the vehicle to a condition in which the control request can be executed safely when the vehicle is determined to be in a condition where the control request cannot be executed safely, wherein the control request is executed in a step of executing the control request when the condition of the vehicle is changed over after the vehicle is determined to be in a condition where the control request cannot be executed safely, whereby the execution ability determination unit determines that the vehicle is in a condition where the control request can be executed safely.

REFERENCE SIGNS LIST

1 Electrically assisted bicycle
2 External terminal
10 Speed sensor
21 Lock
22 Display
23 Assistance unit
100 Remotely controlled device
110 Travel condition acquisition unit
111 Remote operation reception unit
112 Execution ability determination unit
120 Execution control unit
121 Lock control unit
122 Display control unit
130 Changeover control unit
131 Assistance amount adjustment unit

The invention claimed is:

1. A control device for controlling a vehicle in accordance with a control request transmitted from an exterior of the vehicle, the control device comprising a processor configured with a program to perform operations comprising operation as:

an acquisition unit configured to acquire a condition of the vehicle upon reception of the control request;

an execution ability determination unit configured to determine whether the acquired condition of the vehicle is in a condition in which the control request can be executed safely;

an execution control unit configured to execute the control request in response to the condition of the vehicle being determined to be a condition in which the control request can be executed safely; and a changeover control unit configured to implement control to change over the condition of the vehicle to a condition in which the control request can be executed safely, wherein, the processor is configured with the program to perform operations comprising operations such that, in response to the the execution ability determination unit determining that the vehicle is in a condition in which the control request cannot be executed safely, the changeover control unit is activated, and in response to the execution ability determination unit determining that the vehicle is in a condition in which the control request can be executed safely, the execution control unit executes the control request.

2. The control device according to claim 1, wherein the processor is configured with the program to perform operations comprising operations such that the execution ability determination unit determines that the vehicle is in a condition in which the control request can be executed safely in response to a travel speed of the vehicle being no higher than a threshold, and determines that the vehicle is in a condition in which the control request cannot be executed safely in response to the travel speed of the vehicle being higher than the threshold.

3. The control device according to claim 1, wherein the processor is configured with the program to perform operations further comprising operation as an imaging unit for capturing an image of a periphery of the vehicle, wherein the processor is configured with the program to perform operations such that the execution ability determination unit determines that the vehicle is in a condition in which the control request can be executed safely in a case of determining on the basis of the captured image that the periphery of the vehicle is safe, and determines that the vehicle is in a condition in which the control request cannot be executed safely in a case of determining on the basis of the captured image that the periphery of the vehicle is unsafe.

4. The control device according to claim 1, wherein the processor is configured with the program to perform operations such that the execution ability determination unit determines that the vehicle is in a condition where the control request can be executed safely in response to a user riding in the vehicle, and determines that the vehicle is in a condition where the control request cannot be executed safely in response to no user riding in the vehicle.

5. The control device according to claim 1, wherein the processor is configured with the program to perform operations such that the execution ability determination unit determines whether a user is riding in the vehicle using a sensor disposed on a seat portion of the vehicle.

6. The control device according to claim 1, wherein the vehicle is a bicycle, and the processor is configured with the program to perform operations such that the execution ability determination unit determines that the vehicle is in a condition where the control request can be executed safely in response to a stand that supports the bicycle in a standing attitude being in use, and determines that the vehicle is in a condition where the control request cannot be executed safely in response to the stand being not in use to support the bicycle in standing attitude.

7. The control device according to claim 1, wherein the vehicle comprises an image generator or a voice generator, and in response to the condition of the vehicle being in a condition in which the control request cannot be executed safely, the processor is configured with the program to perform operations such that the changeover control unit generates an image or a voice prompting a user of the vehicle to change over to a condition in which the control request can be executed safely using the image generator or the voice generator.

8. The control device according to claim 1, wherein the vehicle comprises a bicycle having an assistance function for assisting self-propulsion, and in response to the condition of the vehicle being in a condition in which the control request cannot be executed safely, the processor is configured with the program to perform operations such that the changeover control unit implements control for suppressing self-propulsion using the assistance function.

9. The control device according to claim 8, wherein, in response to the condition of the vehicle being in a condition in which the control request cannot be executed safely, the processor is configured with the program to perform operations such that the changeover control unit implements control for increasing an amount by which self-propulsion is suppressed in stages using the assistance function.

10. The control device according to claim 8, wherein, in response to the condition of the vehicle being in a condition in which the control request cannot be executed safely, the processor is configured with the program to perform operations such that the changeover control unit displays a warning indicating that control for suppressing self-propulsion is to be implemented on a display unit, and implements the control for suppressing self-propulsion using the assistance function following the elapse of a predetermined time.

11. A control method for controlling a vehicle in accordance with a control request from an exterior of the vehicle, the method comprising:

acquiring a condition of the vehicle upon reception of the control request;

determining whether the acquired condition of the vehicle is in a condition in which the control request can be executed safely;

executing the control request when the vehicle is determined to be in a condition in which the control request can be executed safely; and implementing control for changing over the condition of the vehicle to a condition in which the control request can be executed safely in response to the vehicle being determined to be in a condition in which the control request cannot be executed safely, wherein in response to the vehicle being determined to be in a condition in which the control request cannot be executed safely, the control request is executed in response to the condition of the vehicle being changed over to a condition in which the control request can be executed safely.

12. A non-transitory computer readable medium storing a program for causing a computer to execute the control method according to claim 11.

13. A control system having a control device for controlling a vehicle in accordance with a control request from an exterior of the vehicle, and a management device for transmitting the control request to the control device, the management device comprising a processor configured with a program to perform operations comprising operation as:

an acquisition unit configured to acquire a condition of the vehicle from the control device; and an execution ability determination unit configured to determine whether the acquired condition of the vehicle is a condition in which the control request can be executed safely, wherein the management device transmits the control request to the control device in response to the vehicle being determined to be in a condition in which the control request can be executed safely, and the management device transmits a changeover control request for changing over the condition of the vehicle to a condition in which the control request can be executed safely to the control device in response to the vehicle being determined to be in a condition in which the control request cannot be executed safely, and transmits the control request to the control device in response to determining that the condition of the vehicle has been changed to a condition in which the control request can be executed safely.

* * * * *